Patented Feb. 6, 1934

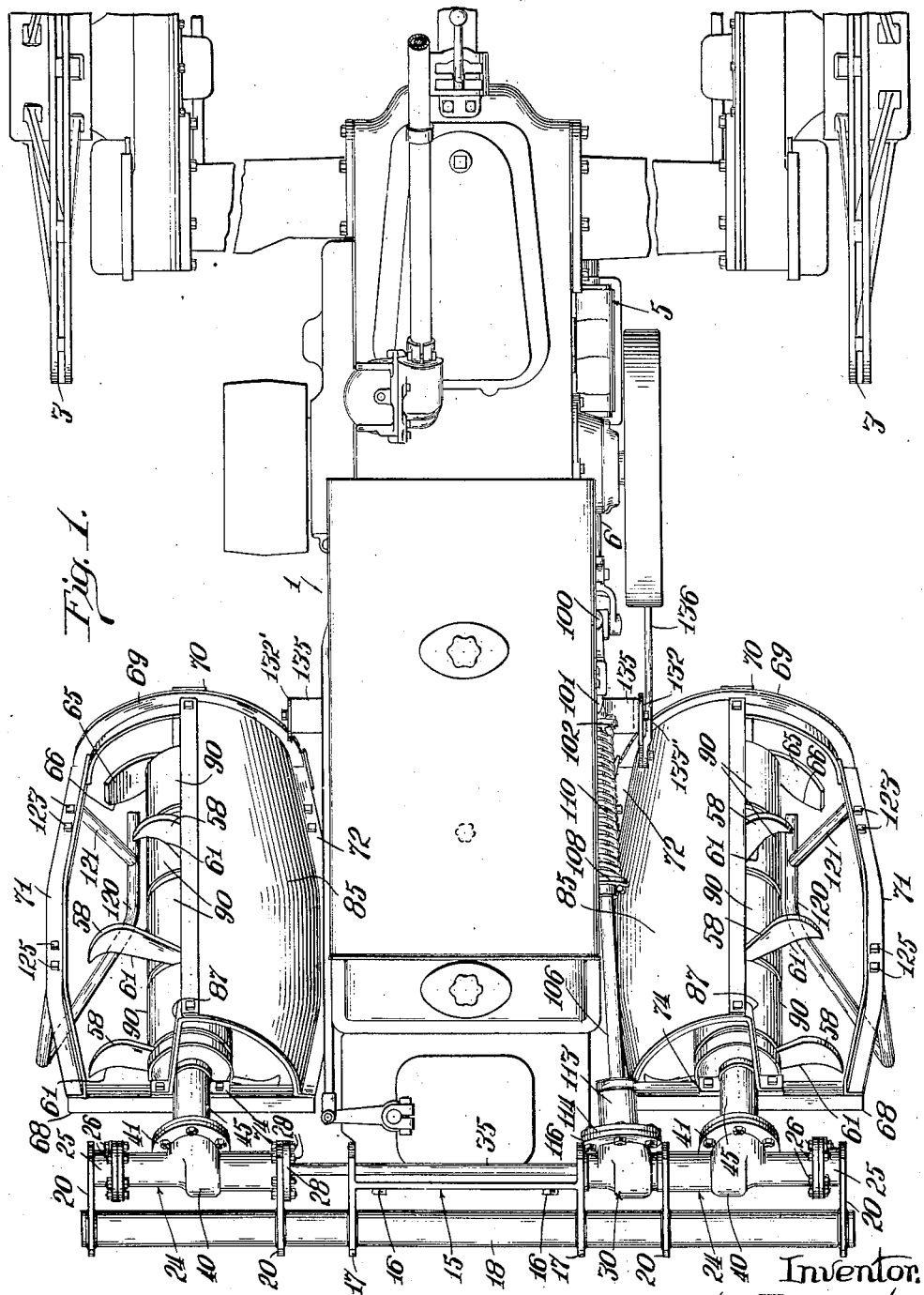

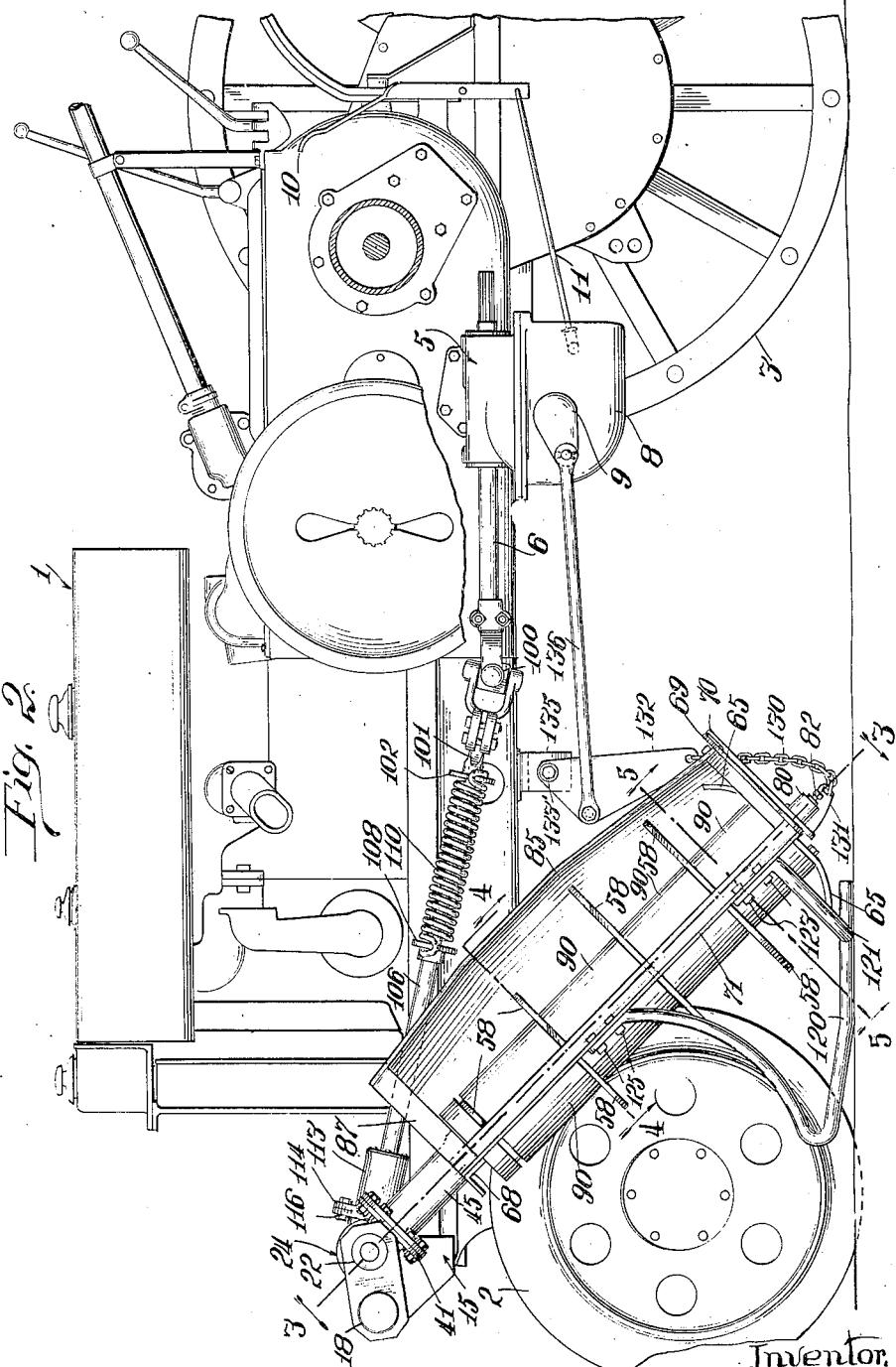

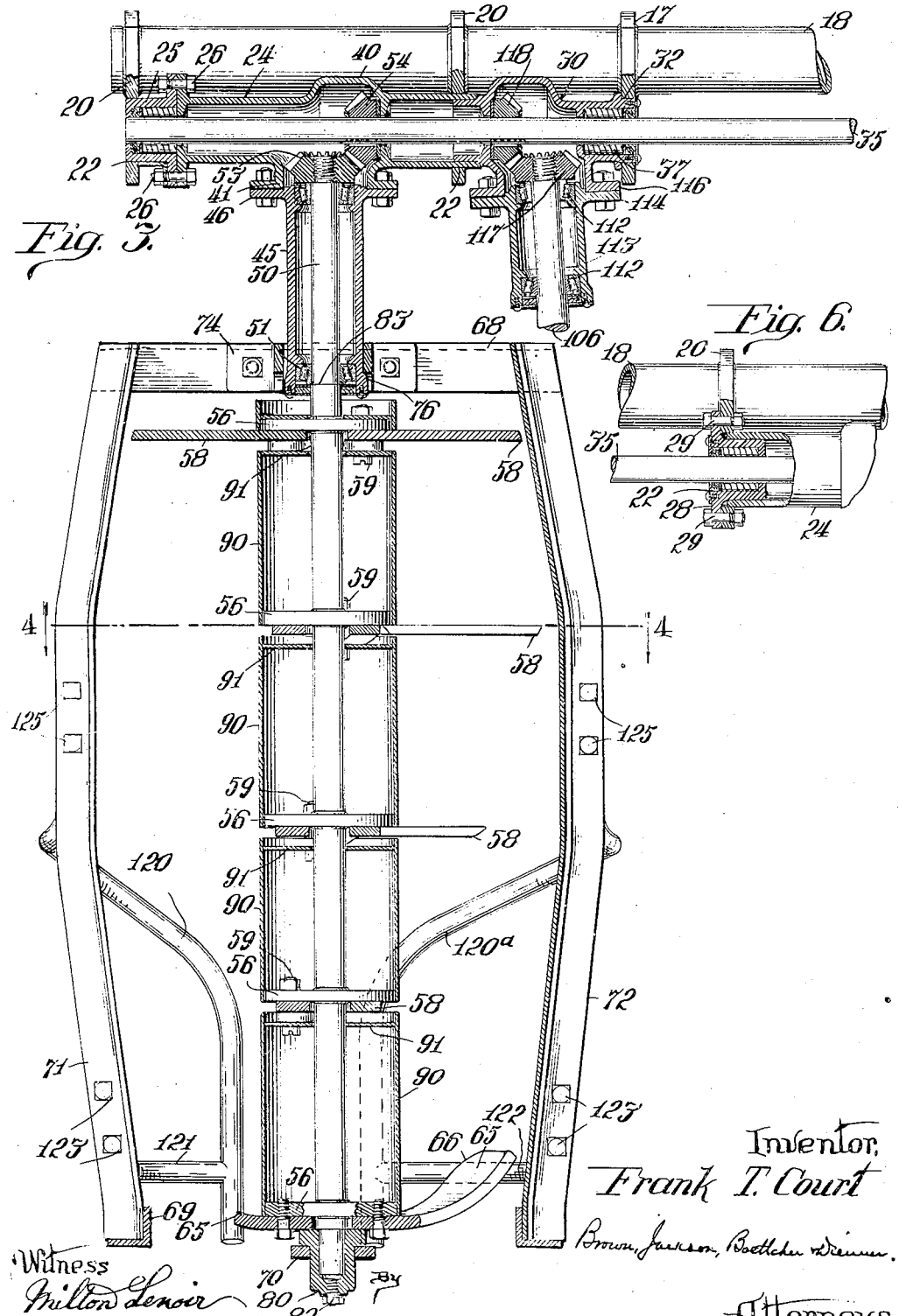

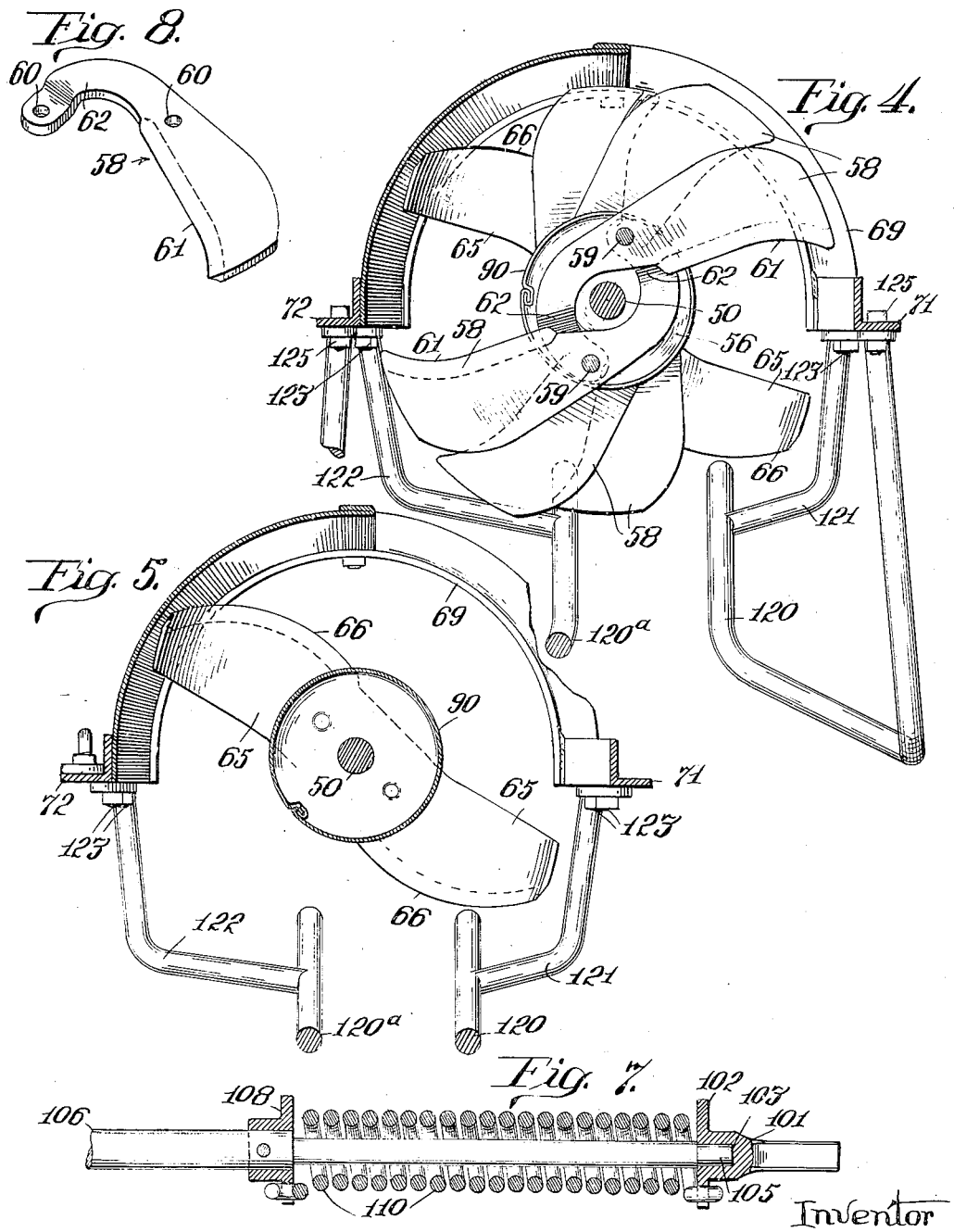

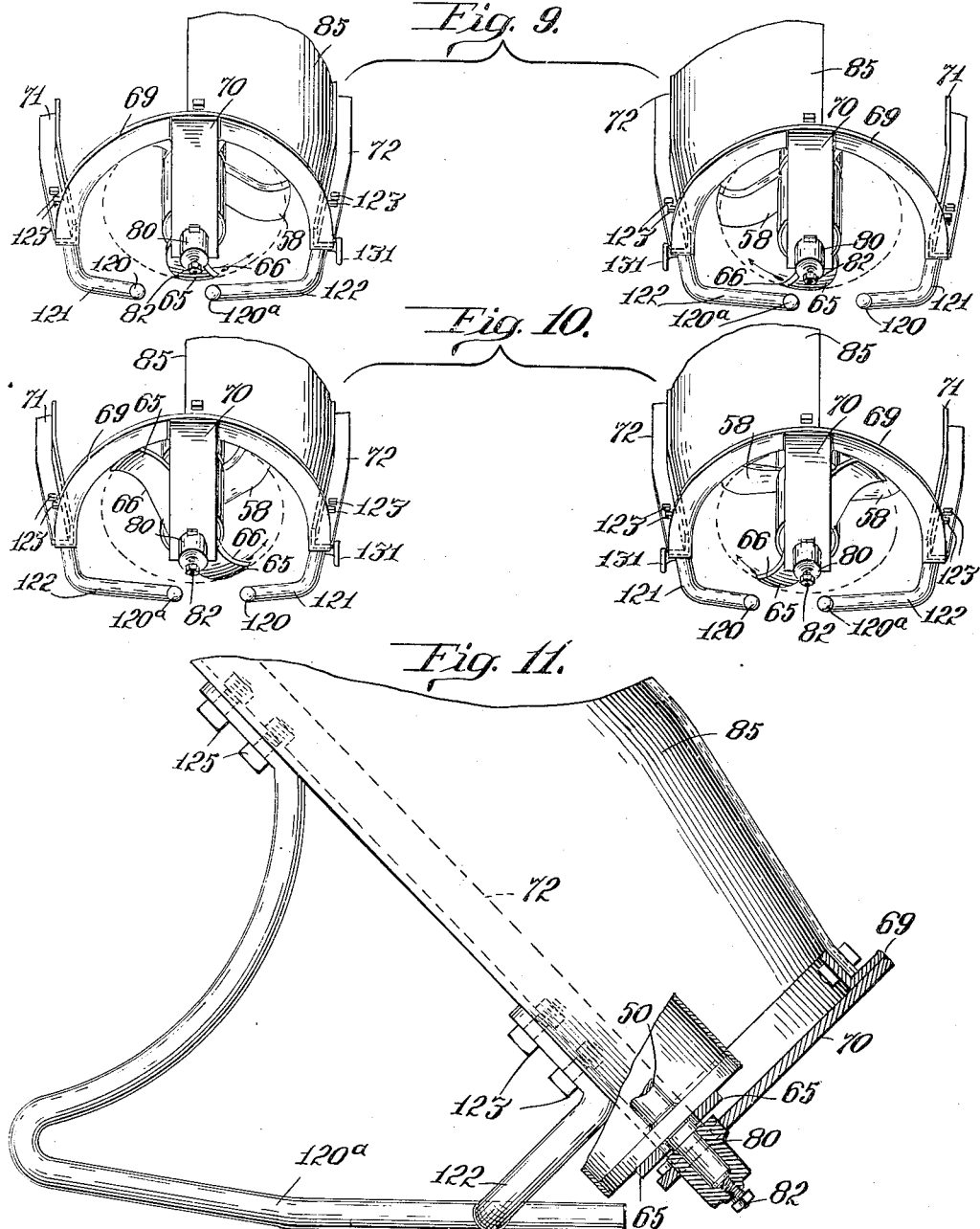

1,945,733

UNITED STATES PATENT OFFICE 1,945,733

STALK SHREDDING IMPLEMENT

Frank T. Court, Moline, Ill., assignor to Deere & Company, Moline, Ill., a corporation of Illinois Application June 11, 1930. Serial No. 460,329

39 Claims. (Cl. 97—47)

The present invention relates generally to agricultural implements and particularly to implements of the type adapted for breaking up and shredding standing stalks in the field whereby the stalks are cut into small portions and deposited on the ground where they may be plowed under, thus serving as fertilizer for enriching the soil. The operation of cutting the stalks and branches of cotton or corn plants is one effective step in the destruction of insects, such as the boll-weevil or the corn borer. Where the stalks are cut into small pieces and deposited on the ground they are subjected to the full force of the sun's rays tending to destroy the insects. Subsequent plowing under the shredded stalks thus burying the stalks and any insects thereon completes the destruction of the same.

Another object of my invention is the provision of a simple and inexpensive cutting element or unit adapted to be removably mounted on the front end of a tractor and to be thereby propelled and driven so that as the tractor passes down the row of standing stalks the latter are completely cut up into small pieces. A still further object of my invention is to so form the cutting knives that as they sever the stalks they are not subjected to any substantial bending stresses.

Another object of my invention is to provide a tractor with a pair of such cutting units each adapted to pass down and cut up a row of standing stalks, the cutting units being so mounted on the tractor that they may pivot in a vertical plane and thus accommodate themselves to unevenness of the ground traversed. A still further object of my invention is to provide on a tractor having power lift cutting units adapted to be elevated to transport position by means of the power lift whereby the cutting units are raised out of engagement with the ground.

A further object of my invention is to provide in an implement of the class described cutting units adapted to be easily adjusted for different row spacing.

Other objects and advantages of my invention will be apparent to those skilled in the art after a consideration of the following detailed description of one preferred embodiment of my invention, taken in conjunction with the accompanying drawings illustrating such embodiment, in which:

Figure 1 is a top plan view showing the tractor with the stalk cutting units mounted on the front end thereof;

Figure 2 is a vertical elevational view of the tractor and cutting units shown in Figure 1;

Figure 3 is a cross section taken substantially on the line 3—3 of Figure 2 and showing, on an enlarged scale, one of the stalk cutting or shredding units;

Figure 4 is a cross section through one of the cutting units corresponding to the section on the line 4—4 of Figures 2 and 3;

Figure 5 is a cross section through one of the stalk cutting units taken on the line 5—5 of Figure 2;

Figure 6 is a fragmentary detail view showing the roller bearing support for the drive shaft on the right hand side of the machine and showing how the right hand stalk cutting unit is pivotally supported;

Figure 7 is an enlarged detail view showing the spring cushioning means in the driving connections between the power take-off of the tractor and the drive shaft for the stalk cutting units;

Figure 8 is a detail view showing in perspective one of the stalk cutting knives;

Figure 9 is a fragmentary view of the rear ends looking forward of the cutting units showing the units arranged for one row spacing;

Figure 10 is a view corresponding to Fig. 9 and showing the units when arranged for another row spacing; and Figure 11 is an enlarged fragmentary sectional view showing the construction of the supporting shoes for the cutting units.

Referring now to the drawings, the reference numeral 1 indicates the tractor having front wheels 2 and rear drive wheels 3. The tractor 1 is also provided with a power take-off 5 having the power take-off shaft 6 driven from the tractor motor in the usual manner as is well understood in the art, and the tractor 1 is also provided with a power lift 8 of the half-revolution type in which a power lift crank arm 9 is alternately swung from a forward position to a rearward position every time the power lift device is tripped, which is accomplished through a pedal 10 and suitable connections 11 therefrom to the power lift 8.

A bracket 15 is carried at the front end of the tractor frame, to which the bracket 15 is bolted as by bolts 16, and the bracket 15 is provided with forwardly extending arms 17 which are apertured to receive the transverse supporting pipe 18. Preferably the supporting pipe 18 is secured in the members 17 by welding or the like.

As best shown in Figure 1 the supporting pipe 18 extends beyond each side of the tractor frame and each end of the supporting pipe 18 has rearwardly extending brackets 20 welded thereto. The rearward ends of the brackets 20 are provided with apertures, see Figure 3, and journaled in each pair of brackets 20 is a housing 24 carried within the apertures 22 and including at their outer ends a bearing support 25 bolted, as by bolts 26, to the housing member proper.

The right hand housing member 24 is pivotally supported at its inner end partially by the bracket 20 and partially by a bearing support 28 bolted, as by bolts 29, to the inner one of the right hand brackets 20. The outer end of the right hand housing member 24 is supported in exactly the same manner as the outer end of the left hand housing member 24 as shown in Figure 3.

On the left hand side of the tractor, looking toward the front end, a housing 30 is journaled in the inner end of the left hand housing member 24, as shown in Figure 3, and in an aperture 32 formed in the left hand arm 17.

The bearing supports 25 and 28, together with the roller bearings associated therewith, support a transversely extending drive shaft 35. The drive shaft 35 is also supported by roller bearings 37 carried at the inner end of the housing 30, as shown in Figure 3, and it will be noted that the drive shaft 35 is coaxially arranged with respect to the housings 24 and their journaled supports on the transverse supporting pipe 18.

Each of the housings 24 are provided with a bell portion 40 and a flanged opening 41 opposite the bell portion 40 for the accommodation of the driving connections between the drive shaft 35 and the stalk cutting units at either side of the tractor. Each of the stalk cutting units includes a bearing support member 45 having a flange 46 at one end adapted to be bolted to the flanged opening 41 of the housing 24. Journaled in the bearing support member 45 is a driven shaft 50, bearings 51 being provided to rotatably support the shaft 50 in the member 45, and at the upper end of the driven shaft 50 there is a pinion 53 secured thereto and which meshes with a gear 54 keyed to the drive shaft 35, as shown in Figure 3.

The driven shaft 50 extends downwardly and rearwardly and has a series of circular plates 56 welded thereto. A pair of stalk cutting knives 58 are bolted diametrically opposite each other to each plate 56 by means of two bolts 59 passing through apertures 60 in each knife.

Each knife 58 has a cutting edge 61 and a curved heel portion 62 adapted to partially embrace the pivot shaft 50, and at its extreme end the heel portion 62 of each knife 58 is offset to overlap the companion knife of the pair so that the intermediate hole 60 of one knife will register with the end hole 60 of the companion knife. In this way each pair of knives is securely fixed to the circular plate 56 and the driven shaft 50. Each pair of knives 58 is positioned at an angle with respect to the adjacent pair so that the cutting edge of all the knives lies in a spiral plane, the most advanced portion of which is at the upper end of the driven shaft 50, as illustrated in Figure 4.

At the extreme lower end of the shaft 50 a single knife 65 is bolted to the lower plate 56. This knife has two cutting edges 66 on diametrically opposite sides and these cutting edges 66 are curved in a direction rearwardly with respect to the direction of rotation of the driven shaft 50 and in the direction opposite to the direction of curvature of the upper pairs of knives 58 which, as will be seen from Figures 4 and 8, have a general curvature extending forwardly in the direction of rotation of the driven shaft 50. In addition, the cutting portion of the lowermost knife 65 is given a general upward curvature as best shown in Figures 2 and 3 so as to provide the necessary clearance above the ground surface and also so that the cutting edges of the lower knife 65 will present a cutting surface in a horizontal plane substantially parallel to the ground surface to cut the stalks close to and substantially even with the ground. By reason of the formation of the lower knife 65 as just described, foreign matter is urged away from the cutters rather than toward them.

Surrounding the driven shaft 50 and the knives 58 and 65 carried thereby is a framework comprising an upward channel iron 68, a lower arched channel iron 69 and two side channel irons 71 and 72. These channel irons or frame members are securely bolted together and are mounted upon the bearing support 45 by means of a strap 74 which embraces the bearing member 45 at its lower end and is bolted to the upper channel iron 68.

From Figure 3 it will be noted that the lower end of the bearing support member 45 is upset or thickened to provide an external shoulder 76. When the strap 74 is tightened it is securely held to the bearing support 45 and is prevented by the shoulder 76 from working loose therefrom.

The lower channel iron 69 is arched upwardly and has bolted, welded or otherwise secured thereto a bracket 70 depending from the mid portion thereof. Secured to bracket 70 is a socket member 80 in which is received a reduced lower end of the driven shaft 50 whereby the shaft 50 is steadied when in operation. The socket member 80 is provided with a threaded aperture to receive a lubricating fixture 82 for lubricating the bearing of the reduced end of shaft 50 in the socket member 80. It will be noted that the inner race of the lowermost bearing 51 on the upper part of the shaft 50 bears against the shoulder 83 on the driven shaft 50. These bearings 51 are adjusted by screwing the gear 53 onto the shaft 50 the required amount. Any desired means may be employed to hold the gear 53 in adjusted position on the shaft 50.

The inner side channel iron member 72 supports a sheet iron shield 85, the top edge of which is supported on bracket 87 while the lower edge is supported on the upwardly arched channel 69.

The framework just described forms a guard to safeguard the operator from coming in contact with the revolving knives and the shield 85 prevents corn or cotton stalk particles from being thrown up into the engine parts of the tractor or towards the operator and to some extent also aids in giving the knives a grip on the stalks. It will also be noted that the distance from the hole 60 to the tip of the cutting edge of the lowermost knife 58, just above the knife 65, is less than the corresponding distance on the other knives 58, as is seen from Figure 4, and the shield 85 slopes inwardly towards the shaft 50 to conform generally to the length of the knives. It will also be observed that the guards or shields 85 extend only partly around the rotatable knives, whereby the shields in preventing the corn or cotton stalk particles from being thrown up into the tractor serve to direct the plant particles outwardly and scatter the same over the field.

Referring to Figure 3, it will be noted that sleeves or cylinders 90 are clamped between the lower surface of the heel portion of the knives and the next lower plate 56, the cylinders 90 being provided for this purpose with discs 91 received underneath the heads of the bolts 59.

The stalk cutting unit at the right of the tractor is substantially identical with the left hand stalk cutting unit just described in all respects except for the slight difference between the right hand housing 24 and the left hand housing 24, the reason for this difference being to accommodate the driving connections between the drive shaft 35 and the power take-off shaft 6 on the tractor.

These connections will now be described. A universal joint 100 of the usual type is secured to the forward end of the power take-off shaft 6 and to a squared connecting member 101 having at its forward end a radial flange 102 and a bearing socket 103 formed thereon. The connecting member 101 rotatably receives in its bearing socket 103 the reduced end 105 of a forwardly extending shaft 106 and mounted near its rear end but forward of the flange 102 is a flanged collar 108 pinned or otherwise secured to the shaft 106. The front end of a torsion spring 110 is connected to the flange 108 while the rear end of the spring 110 is connected to the flange 102. Thus a flexible or cushioned drive between the universal joint 100 and the shaft 106 is attained for absorbing shocks and suddenly applied loads whereby the tractor mechanism is protected from excessive stresses due to the knives striking rocks or other hard objects. In its normal position the coils of the spring 110 are separated so that there will be no interference when the spring 110 is wound up somewhat due to an overload on the machine from any cause. In other words, the spring 110 is so arranged that it will not go solid when in operation.

The forward end of the shaft 106 is journaled, as by bearings 112, in a bearing housing 113 having a flange 114 bolted to the flange 116 formed on the housing 30, as best shown in Figure 3. A pinion 117 is secured to the forward end of the shaft 106 and is adapted to mesh with the gear 118 keyed to the drive shaft 35 and arranged to operate the shaft 35 to drive each of the stalk cutting units.

Each stalk cutting unit rests on the ground on a pair of shoe members 120 and 120a which are supported at their forward ends from the frame members 71 and 72 by means of brackets 121 and 122, respectively, the brackets being preferably bolted to the channel iron frame members 71 and 72 by bolts 123, as shown in Figure 3. Preferably these shoe members comprise round rods suitably formed where they are bolted to the framework of the cutter units. The forward ends of the shoes 120 and 120a are curved upward slightly and outwardly and then rearwardly, the last mentioned portion being bolted to the frame members 71 and 72, as shown at 125 in Figure 3. The principal purpose of these shoe members is to support the rear ends of the cutting units and to guide the stalks in position to be struck by the knives of the cutter units. The substantially horizontal portion of each of the shoe members also aids the knives in their cutting operation in serving to prevent the stalks from bending over under the ground surface.

In Figure 2 the stalk cutting units are shown as resting on the ground which is the position occupied when they are in operation. When the machine is to be transported or turned around at the end of the rows, the cutting units may be lifted free of the ground through a simple and efficient connection with the power lift 8 on the tractor. This connection comprises a chain 130 which is connected to the eye 131 on the lower end of frame member 72 and to the lower end of a swinging arm 132 fixed to a shaft 133' carried by two spaced brackets 135 fixed on the lower side of the tractor 1. The arm 132 is pivotally connected to the crank arm 9 of the power lift 8 by means of a rod or link 136, as best shown in Figure 2. The right hand stalk cutting unit is connected to be elevated by the power lift crank arm 9 in a similar manner, an arm 132' similar to 132 being fixed on the other end of shaft 133' and connected to the right hand unit by a chain identical with chain 130.

As best shown in Figures 3, 9 and 10, the two shoes of each unit are not symmetrical, one being bent inwardly more than the other. By placing the shoes bent inwardly the greatest amount on the inside of the two units and the other shoes on the outside, as shown in Fig. 9, one row spacing is accommodated. By reversing the shoes as shown in Fig. 10 a different row spacing is accommodated.

The operation of my device is as follows: When in use the rear tractor drive wheels 8 are adapted to straddle two of the stalk rows while the front wheels 2 are adapted to pass between the same two rows. The power take-off shaft 6 drives the transverse drive shaft 35 through the cushion spring 110 and the fore and aft extending shaft 106, and the two stalk cutting units are driven from the gears 54 at either end of the drive shaft 35. Each of the stalk cutting units is supported in a downward and rearward inclined position substantially between the front wheels 2 and the rear drive wheels 3, both as regards their fore and aft position as well as their relative lateral positions transversely of the tractor. Each of the stalk cutting units is adapted for independent pivotal movement in a vertical plane by virtue of the journaled support at each housing 24 in its supporting brackets 20 coaxially with respect to the drive shaft 35. Thus, up and down movement of the stalk cutting units does not in any way affect the drive from the shaft 35 to the driven shaft 50 which carries the stalk cutting elements. In order to raise the stalk cutting units from engagement with the ground, all that is necessary to do is to trip the power lift 8 by means of the pedal 10, whereupon the power lift crank arm 9 will be rocked rearwardly to turn the arms 132 and 132' in a counterclockwise direction as viewed in Fig. 2, thereby elevating the stalk cutting units. The rapidly rotating power driven knives quickly cut each stalk into small portions as the machine moves along the rows, the stalk cutting units being so spaced as to bring each of them directly over a row of stalks. As pointed out above, the knives of each stalk cutting unit are arranged spirally on the driven shaft 50 and the power driven shafts are inclined downwardly and rearwardly so that the knife which strikes the stalks first is one of the upper pair of knives. Thus, a portion is cut from the top of the stalk first. As the machine moves along, the next knife which strikes the stalks is one of the second pair of knives, which thus cuts a portion from the top of the remaining standing portion of the stalk. Thus, when the machine is in operation, portions are progressively cut from the top of the stalk until the lowermost knife 65, which is the last knife to strike the stalk, severs the stalk even with or close to the ground surface.

By reason of the curvature of the cutting edges of the knives 58 forwardly in the direction of rotation, these knives act upon the stalks in much the same manner as with a scythe. Due to the resistance of cutting and also the forward motion of the machine the stalks are gathered inwardly and are, to a certain extent, wrapped around the drums or cylinders 90 where the upward pull of the knife on the stalk due to the rearward inclination of the shaft 50 will cut the stalk if it has not been cut before.

Near the ground surface there may be a certain amount of foreign matter which might stall the machine if caused to wrap around the drums or cylinders 90. By reason of the curvature of the cutting edges of the lowermost knife 65 in the direction opposite to the direction of rotation, this foreign matter is urged away from the drums or cylinders 90 rather than toward it. The danger of the lower knives 58 becoming clogged with foreign matter is thus avoided. The lower knife 65 is nevertheless effective in cutting the stalks at or near the ground surface because the stalks are stiff enough at this point to resist bending.

Referring to Figures 3, 4, 5 and 8, it will be noted that the knives 58 are sharpened with the bevel on the lower side so that the cutting edge is substantially in the plane of the upper surface of these knife blades. With the knives sharpened in this manner, the lower beveled edge tends to guide the knife through the stalks in such a direction which when combined vectorially with the direction of the knife in rotating and in moving forward bodily with the tractor results in a c'ean slice through the stalk without tearing the same. The angle of the cutting edge is so proportioned with respect to the rotational speed of the knife and the forward speed of advance of the tractor that in cutting through a stalk no bending stress either up or down is introduced into the knife itself. Briefly, the bevel on the lower side of the knife is such that the knife in passing through the stalk is urged in the general direction in which it is being propelled by the tractor, whereas if the reverse were true, that is if the bevel was on the upper side of the knife, the knife would be urged downwardly and in opposition to the general forward movement of the machine which would tend to bend the knives downwardly.

The knives strike the stalks at one side and in a forwardly and downwardly inclined plane, but the bevel on the lower side of the knives, together with the forward movement of the machine, causes the knives to cut through the stalks in an inclined forward and lateral direction.

While I have described in connection with the accompanying drawings one preferred embodiment of my invention, it will be apparent to those skilled in the art that my invention is not to be limited to the specific structure shown and described but that, in fact, widely different means may be employed in the practice of the broader aspects of my invention. For example, under certain conditions it may be desirable to provide a four row machine in which case the supporting pipe 18 can be made longer and can have four cutter units mounted thereon instead of two as illustrated in the drawings. For the purpose of driving the two outer units in case four are employed it is a simple matter to provide the drive shaft 35 with suitable extensions connected by means of universal joints if desired.

What I claim, therefore, and desire to secure by Letters Patent is:—

1. A device of the class described comprising, in combination, a tractor having a power take-off, a supporting member carried by the tractor, stalk shredding means having one end movably carried by the supporting member and the other end supported on the ground, and connections from the power take-off of the tractor to the shredding means to drive the same.

2. A device of the class described comprising, in combination, a vehicle, a frame for the vehicle, a supporting member carried on each side of the frame and having a pair of spaced rearwardly extending brackets near each end, a housing member pivotally mounted in each pair of brackets, a drive shaft extending from one housing member to the other and journaled therein, stalk cutting means including framework secured to the pivoted housings and rotary cutting elements having a driving connection wtih the drive shaft, and means on the vehicle to actuate the drive shaft.

3. In a two-row stalk shredder of the class described, the combination with a vehicle and a frame therefor, of a pair of stalk cutting devices and comprising a plurality of elements each having a cutting edge, shaft means rotatably supporting said elements and means to drive the shaft means, and means comprising shiftable stalk guides to adapt said devices for different row spacing.

4. A device of the class described comprising, in combination, a vehicle, a frame for the vehicle, a supporting member carried on each side of the frame, a transverse shaft journaled on the supporting member, a housing journaled on the supporting member at either side of the frame and coaxially with the shaft, stalk cutting means having frame members connected with each housing and rotary cutting elements driven by the shaft, means supporting the lower ends of the stalk cutting means on the ground, and means to adapt said stalk cutting means for different row spacing.

5. A two-row stalk cutter adapted to cut the stalks into short lengths comprising, in combination, a tractor having a power take-off, a transverse drive shaft journaled at the forward end of the tractor and operatively connected to the power shaft, a stalk cutter unit at either side of the tractor and driven by the drive shaft, and means mounting the units for vertical swinging about the axis of the drive shaft, and shoes supporting the lower ends of said units on the ground.

6. A machine of the class described comprising, in combination, a wheeled frame, a stalk cutter mounted at its forward end on the frame and adapted to swing in a longitudinal plane to follow variations in the ground surface, said stalk cutter including a series of cutting elements each adapted to sever the stalk, means to raise the rear end of said cutter out of contact with the ground, and means to rotate said cutting elements.

7. A two-row stalk cutter adapted to cut the stalks into short lengths and comprising, in combination, a tractor having widely spaced rear wheels adapted to straddle two rows and relatively narrow front wheel means adapted to pass between two adjacent rows, supporting means on the tractor extending transversely and provided with means securing the same to the front of the tractor, rotatable stalk cutter units mounted on the supporting means so as to follow variations in the ground surface and so positioned relative to the tractor as to lie between the front and rear wheels, and driving connections extending between the tractor and the units to drive the latter.

8. A two-row stalk cutter adapted to cut the stalks into short lengths and comprising, in combination, a tractor having widely spaced rear wheels adapted to straddle two rows and relatively narrow front wheel means adapted to pass between two adjacent rows, supporting means on the tractor extending transversely and provided with means securing the same to the front of the tractor, rotatable stalk cutter units mounted on the supporing means so as to follow variations in the ground surface and so positioned relative to the tractor as to lie between the front and rear wheels, both longitudinally and fore and aft of the tractor, and driving connections extending between the tractor and the units to drive the latter.

9. An agricultural implement comprising, in combination, a wheeled frame including a transversely extending supporting member removably mounted and having a pair of spaced brackets near each end, a housing member pivotally mounted in each pair of brackets, a drive shaft extending from one housing to the other and journaled therein, stalk cutting means including a bearing supporting member secured to each of the pivoted housings and extending outwardly therefrom, frame members carried by the last mentioned members, a shaft journaled in each of the bearing supporting members, bevel gears connecting each of the last mentioned shafts to the drive shaft, rotary cutting elements fixed to the shafts and adapted to contact with and shred stalks standing in a row, and power means on the wheeled frame operatively connected with the drive shaft to actuate the cutters.

10. In a stalk shredder of the class described, the combination with a vehicle and a frame therefor, of stalk cutting means comprising a plurality of elements each having a cutting edge, shaft means rotatably supporting said elements and extending at an angle to the direction of travel, means to drive the shaft means, and means to direct the stalk shreds away from the vehicle.

11. A device of the class described comprising, in combination, a tractor having a power take-off and a power lift, a transverse supporting member carried on the tractor, stalk shredding devices pivotally supported by the transverse member for up and down movement, driving connections between the shredding devices and the power take-off, means connecting the shredding devices to the power lift whereby the shredding devices may be elevated, and means to direct the shredded stalks laterally outwardly of the tractor.

12. A rotary stalk cutter comprising a frame, a shaft journaled therein and inclined relative to the horizontal, a cutting element secured to the shaft and having a cutting edge adapted to strike the stalks, the cutting edge being curved forwardly in the direction of rotation and formed with a bevel adapted to prevent the element from being urged downwardly in passing through the stalks in cutting the same.

13. A rotary stalk cutter comprising a frame, a shaft journaled therein and inclined relative to the horizontal, a cutting element secured to the shaft and having a cutting edge adapted to strike the stalks, the cutting edge formed with a bevel on the underside of the element, and a second cutting element formed with a curved portion presenting a cutting edge substantially in a horizontal plane when in stalk cutting position.

14. A stalk cutter of the class described comprising a wheeled frame adapted to pass down the row of stalks, a shaft journaled for rotation in the frame, a plurality of stalk cutting elements fixed to the shaft, certain of said elements being adapted to strike each stalk in advance of the other elements, means carried by and including portions extending generally upwardly with respect to the axis of said shaft to urge foreign matter away from the shaft and knives, and means to rotate the shaft.

15. A rotary stalk cutter comprising a frame, a shaft journaled therein and inclined downwardly and rearwardly, a series of knives secured to the shaft and presenting a cutting edge curved forwardly in the direction of rotation, said series being arranged spirally of the shaft and secured thereto in pairs, a bottom cutting element formed to present a cutting edge in a substantially horizontal plane, the cutting edge curved rearwardly relative to the direction of rotation whereby foreign matter is urged away from said knives, and means to rotate the shaft.

16. A rotary stalk cutter comprising a frame, a shaft journaled therein and inclined relative to the horizontal, a cutting element secured to the shaft and having a cutting edge adapted to strike the stalks, the cutting edge being curved forwardly in the direction of rotation and formed with a bevel on the underside of the element whereby as the cutter moves along the row each stalk is given an upward and forward slice and thereby severed without introducing bending stresses in the cutting element.

17. A device of the class described comprising, in combination, a tractor having a power take-off, a transverse supporting member carried by the tractor, stalk shredding means carried by the supporting member, and connections from the power take-off of the tractor to the stalk shredding means to drive the same, said connections comprising a rotatable shaft geared to the stalk shredding means, a second shaft coaxially arranged with respect to said first shaft, and spring means having one end connected with said first shaft and the upper end connected with said second shaft for cushioning the drive from the power take-off to the stalk shredding means.

18. A device of the class described comprising, in combination, a tractor having a power take-off and a power lift driven from the power take-off, a transverse supporting member carried on the tractor, stalk shredding devices pivotally supported by the transverse member for up and down movement, driving connections between the shredding devices and the power take-off and means connecting the shredding devices to the power lift whereby the shredding devices may be elevated, said connecting means including a transverse shaft journaled on the frame of the tractor, link means rigidly connected with the transverse shaft and connected with said shredding devices, and means associated with the power lift and said transverse shaft for swinging said link means to raise and lower the shredding devices.

19. An agricultural implement comprising a tractor having a frame, a power take-off, and a power lift, a rotatable stalk shredding device pivotally carried by the frame of the tractor, power transmitting connections between the rotatable stalk shredding device and the power take-off of the tractor, a transverse lifting shaft, brackets secured on the under side of the tractor frame and supporting said transverse lifting shaft, a depending link fastened to said shaft and having its lower end connected with said shredding device, and a tension rod having one end connected with the power lift of the tractor and the other end connected to rock said shaft, whereby the power lift of the tractor is operative to raise and lower said shredding device about its pivotal support.

20. A two-row stalk shredder of the class described, comprising a vehicle and a frame therefor, a pair of stalk cutting devices each comprising a plurality of elements having a cutting edge, shaft means rotatably supporting said elements, means to drive the shaft means and a shield partially surrounding said cutting elements and acting to direct the cut stalks laterally away from the vehicle.

21. A stalk cutter of the class described comprising a wheeled frame adapted to pass down the row of stalks, a shaft journaled for rotation in the frame, a plurality of stalk cutting elements fixed to the shaft in spiral formation the most angularly advanced element being at the upper part of the shaft whereby the top of the stalk is severed first and then lower portions of the stalk are progressively severed, the lowermost cutting element being formed to sever the stalks substantially at the surface of the ground, and means to cause said cutting elements to follow irregularities of the ground surface.

22. In a stalk shredder of the class described, the combination with a vehicle and a frame therefor, of stalk cutting means comprising a plurality of rotary elements each having a cutting edge, shaft means rotatably supporting said elements, means on the frame to drive the shaft means, and a shield supported substantially one quarter around the rotatable cutting elements and arranged to direct the stalk shreds away from the vehicle and to scatter them laterally.

23. An agricultural machine comprising, in combination, a wheeled frame, a supporting member movably carried by said frame, stalk shredding devices carried by said supporting member on each side of said frame, each of said stalk shredding devices having one end carried by the supporting member and the other end supported on the ground, and means connected with the lower end of each of said stalk shredding devices for guiding the stalks to be shredded thereto.

24. An agricultural machine comprising, in combination, a wheeled frame, a supporting member carried by said frame for relative vertical movement, stalk shredding devices carried by said supporting member on each side of said frame, each of said stalk shredding devices having one end carried by the supporting member and the other end supported on the ground, and means connected with the lower end of each of said stalk shredding devices for guiding the stalks to be shredded thereto, said last named means acting as supporting means for the lower ends of said stalk shredding devices.

25. A stalk shredder of the class described comprising, in combination, a wheeled supporting frame, a stalk cutting unit comprising a vertically movable frame pivoted to the wheeled frame, a shaft journaled in said movable frame, a plurality of cutting elements supported by said shaft, and ground engaging shoes connected with the lower end of said shredder frame on either side of the shaft, means on said shoes acting to direct the stalks to said unit, and means on the wheeled frame for driving said shaft.

26. A stalk shredding unit comprising a shredder frame including an upper transverse bar, and a pair of side bars, a rotatable shaft carrying a plurality of stalk cutting elements, journal means supporting said shaft in said shredder frame for rotation relative thereto, and ground engaging shoes supporting said unit, one shoe being connected to each of said side bars.

27. A stalk shredder unit comprising, in combination, a shredder frame including a pair of side bars, cutting elements rotatably supported by said shredder frame, and supporting shoes connected to said side bars, stalk guiding means associated with each of said shoes and arranged to direct stalks to said cutting elements, said shoes and stalk guiding means being formed of stock which is curved forwardly and upwardly, then outwardly and lastly rearwardly.

28. An agricultural machine of the class described comprising, in combination, a wheeled frame, pivotal supporting means on said frame, a plurality of stalk cutting devices, one at either side of the wheeled frame and each carried at its forward end on said supporting means and extending downwardly and rearwardly therefrom, each of said devices including a movable frame comprising a pair of side bars, and a pair of ground engaging shoes for each of said cutting devices, one shoe being removably connected with each of said side bars, and stalk guiding means carried by each shoe and adapted to direct stalks to said cutting devices, said guiding means associated with each pair of shoes being eccentrically disposed with respect to the axis of said cutting devices so that when a pair of shoes at one side of the wheeled frame is interchanged with those at the other side of the frame the cutting devices are adapted for a differential spacing.

29. A stalk shredding device comprising a frame, a rotatable shaft journaled in said frame, a plurality of circular plates secured to said shaft, a cutting element mounted on each plate, and an enclosing cylinder extending between each cutting element and the next adjacent circular plate.

30. In a stalk shredding unit, a rotatable shaft, circular plates secured to said shaft, a plurality of pairs of cutting elements, one pair being bolted to each of said plates, and cylindrical members, each bolted to one pair of cutting elements and extending to the next adjacent circular plate.

31. In a stalk shredder, a rotatable shaft, a circular plate secured to said shaft, and a pair of cutting elements bolted to said plate, each cutting element comprising a knife having a cutting edge and a curved heel portion, the heel portions of the two cutting elements being adapted to embrace the shaft and to be bolted to said plate.

32. A cutting element for stalk shredders and the like comprising a knife having a forwardly curved cutting edge and a curved heel portion adapted to embrace a supporting element, said heel portion having an offset end adapted to overlie the cutting edge of an adjacent knife.

33. A two-row stalk cutter adapted to cut the stalks into short lengths and comprising, in combination, a tractor, supporting means on the tractor extending transversely and provided with means securing the same to the tractor, rotatable stalk cutter units mounted for rotation about an axis disposed in a longitudinal vertical plane and arranged on the supporting means so as to follow variations in the ground surface, and driving connections extending between the tractor and the units to drive the latter.

34. An agricultural machine comprising, in combination, a wheeled frame, a supporting member carried by said frame, and stalk shredding devices carried by said supporting member on each side of said frame, each of said stalk shredding devices including cutters mounted for rotation about an axis disposed in a longitudinal vertical plane and each of said devices having one end carried by the supporting member and the other end supported on the ground.

35. A two-row stalk cutter adapted to cut the stalks into short lengths and comprising, in combination, a tractor having spaced rear wheels adapted to straddle two rows and front wheel means adapted to pass between two adjacent rows, supporting means on the tractor, stalk cutting devices carried by the supporting means for relative vertical movement, ground engaging means for gauging the operating position of said stalk cutting devices, and means for driving the latter.

36. A stalk cutter of the class described comprising a wheeled frame adapted to pass down the row of stalks, a shaft journaled for rotation in the frame, a plurality of stalk cutting elements fixed to the shaft, certain of said elements having cutting edges curved forwardly in the direction of rotation of said shaft and another element having its cutting edge curved rearwardly with respect to the direction of rotation of said shaft, and means to rotate said shaft.

37. An agricultural machine comprising a supporting frame, and a shredding unit carried thereby and comprising a downwardly and rearwardly inclined rotatable shaft having a plurality of cutting elements fixed thereto and disposed in planes substantially perpendicular to the axis of said shaft, said rotatable shaft also having a cutting element at the lower end of the shaft, the operating portion of said last named cutting element being disposed at an angle to said shaft equal to the downward inclination of the latter so that said portion of the lower cutting element operates parallel to the ground.

38. A stalk cutter comprising a supporting frame, a shredding unit carried thereby and comprising a downwardly and rearwardly inclined rotatable shaft, a plurality of cutting elements fixed thereto and disposed in planes perpendicular to the ends of said shaft, and a cutting element at the lower end of said shaft, said last named cutting element having an operating portion disposed at an angle to the axis of said shaft which is equal to the angle which said shaft makes with the ground surface, whereby the lower cutting portion of said last named element operates parallel to the ground, and means for driving said shaft.

39. A stalk cutter comprising a supporting frame, a shaft journaled thereon and inclined downwardly and rearwardly, a plurality of cutting elements secured to said shaft above the lower end thereof, and a bottom cutting element secured to said shaft adjacent the lower end thereof and formed to present a cutting edge in a substantially horizontal plane.

FRANK T. COURT.